United States Patent
Walter et al.

(10) Patent No.: US 7,865,558 B2
(45) Date of Patent: Jan. 4, 2011

(54) STB MESSAGING SYSTEM

(75) Inventors: Edward Walter, Boerne, TX (US); Michael Raftelis, San Antonio, TX (US); John Kirby, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 532 days.

(21) Appl. No.: 11/801,081

(22) Filed: May 7, 2007

(65) Prior Publication Data

US 2008/0281926 A1    Nov. 13, 2008

(51) Int. Cl.
*G06F 15/16*    (2006.01)

(52) U.S. Cl. .................................... 709/206; 709/207
(58) Field of Classification Search ................. 709/206, 709/207, 238; 725/32
See application file for complete search history.

(56) References Cited

U.S. PATENT DOCUMENTS

| | | | |
|---|---|---|---|
| 6,763,095 B1 | 7/2004 | Cermak et al. | |
| 6,816,724 B1 * | 11/2004 | Asikainen | 455/414.1 |
| 6,912,564 B1 | 6/2005 | Appelman et al. | |
| 7,116,994 B2 * | 10/2006 | Hatch | 455/466 |
| 2003/0226143 A1 * | 12/2003 | Michael et al. | 725/32 |
| 2004/0163130 A1 | 8/2004 | Gray et al. | |
| 2005/0091694 A1 | 4/2005 | Rambo | |
| 2005/0277406 A1 | 12/2005 | Diroo et al. | |
| 2006/0031367 A1 | 2/2006 | Buford et al. | |
| 2006/0168054 A1 | 7/2006 | Burkhart et al. | |
| 2006/0174010 A1 | 8/2006 | Deshpande | |

* cited by examiner

*Primary Examiner*—Ramy M Osman
*Assistant Examiner*—Marshall McLeod
(74) *Attorney, Agent, or Firm*—Ed Guntin; Guntin Meles & Gust, PLC

(57) ABSTRACT

There are provided a method, a system and a machine-readable medium for video terminal device messaging. In one embodiment, a method includes querying a user associated with a mobile device whether to receive one or more mobile messages destined for the mobile device at a video terminal device; and selectively receiving the one or more mobile messages at the video terminal device based on a response to the querying.

36 Claims, 6 Drawing Sheets

STB MESSAGING SYSTEM

TECHNICAL FIELD

The present application relates generally to digital video broadcasting systems. More particularly, example embodiments are directed to system, method and machine readable medium for set top box (STB) messaging.

BACKGROUND

Recent developments in digital technology have spurred the development and deployment of digital video broadcasting services. The digital video broadcasting services, including high quality video programming such high-definition (HD) programs, are typically provided by satellite broadcasters, terrestrial broadcasters and cable broadcasters. More recently, digital broadcast programs have also been deployed via the Internet Protocol (IP) by major telecommunication providers.

Video broadcasters have traditionally distributed video broadcasts to viewers using a variety of broadcasting standards, including the analog National Television Standard Committee (NTSC) standard. More recently, with the constant expansion of the number of video broadcast channels, HD video broadcasts and provision of data, all of which have placed a premium on bandwidth for transmission, the distribution of video broadcasts has been achieved via digital standards, including the Advanced Technical Systems Committee (ATSC) standard. Other digital standards that are being user today include the Moving Picture Experts Group H.262 (MPEG-2) standard, the H.264 (MPEG-4) standard and the Digital Video Broadcasting (DVB) standard.

Digital video broadcasts are transmitted or distributed from the aforementioned video broadcasters via a variety of video distributions systems to an end user's digital set top box (STB) which decodes the digital video signal for display on a video display device (e.g., television). The digital video signal may be received by the STB via a satellite dish, a coaxial cable, a telephone line (including digital subscriber line (DSL)), Ethernet, local and wide area wireless technologies, and the like.

Many current mobile devices, such as cellular phones, provide the ability to send and receive messages (e.g., mobile messaging), including short message service (SMS) messages, concatenated SMS (CSMS) messages, enhanced messaging service (EMS) messages, email messages, and the like. Operators of the aforementioned video distribution systems have continuously grappled with integration of different services via the video distribution systems to improve users' experience and therefore retain users. However, the operators have not been able to integrate mobile messaging into the video distribution systems.

BRIEF DESCRIPTION OF THE DRAWINGS

Some embodiments are illustrated by way of example and not limitation in the figures of the accompanying drawings in which.

DETAILED DESCRIPTION

An example system, method and machine readable medium for set top box (STB) messaging are described.

In accordance with an example embodiment, there is provided a method, a system and a machine-readable medium for video terminal device messaging. The method includes querying a user associated with a mobile device whether to receive one or more mobile messages destined for the mobile device at a video terminal device, and selectively receiving the one or more mobile messages at the video terminal device based on a response to the querying.

In accordance with another example embodiment, there is provided a method, a system and a machine-readable medium for redirecting a mobile message. The method includes receiving a mobile message from at least one sending device destined for a mobile device, and selectively transmitting the received mobile message to a video terminal device based on a redirect request from the video terminal device.

In accordance with a further example embodiment, there is provided a method, a system and a machine-readable medium for video terminal device messaging. The method includes transmitting a request from a video terminal device to a mobile device to synchronize one or more mobile messages destined for the mobile device with the video terminal device, and selectively receiving the one or more mobile messages at the video terminal device from the mobile device in response to the request.

Figure 1:
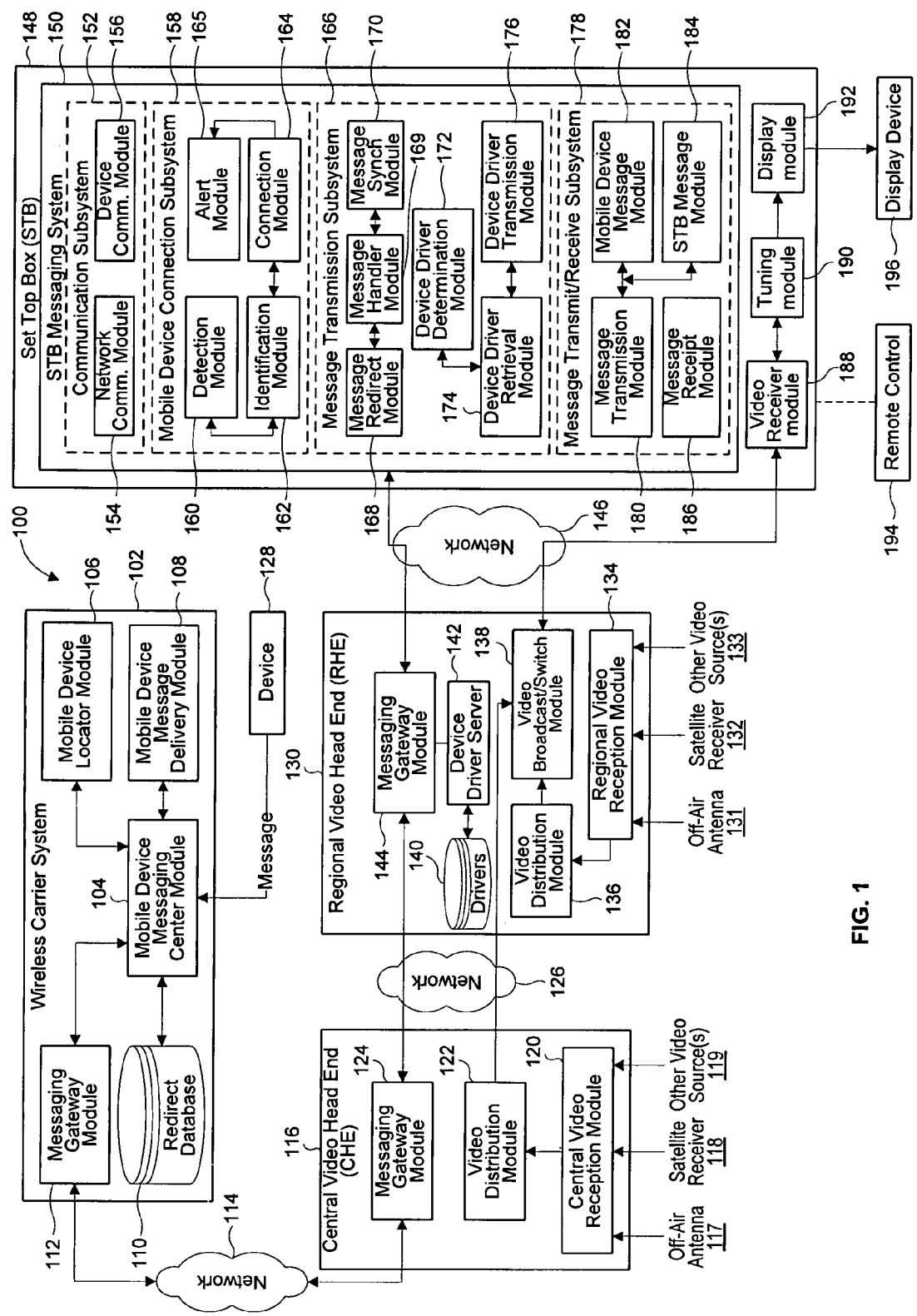
FIG. 1 is a high-level block diagram of an example video broadcasting system that integrates mobile messaging into the video broadcasting system.

FIG. 1 is a high-level block diagram of an example video broadcasting system 100 that integrates mobile messaging into the video broadcasting system 100. The video broadcasting system 100 includes a wireless carrier system 102, a central video head end (CHE) 116, a regional video head end (RHE) 128, and a set top box (STB) 148 (e.g., video terminal device). The wireless carrier system 102 is communicatively interconnected to the CHE via network 114. The CHE 116 is in turn communicatively interconnected to a regional video head end (RHE) 130 via network 126. Still in turn, the RHE 130 is communicatively interconnected to an end user's set top box (STB) 148 via network 146. It is noted that for clarity and simplicity of the depiction one CHE 116, one RHE 130 and one STB 148 are described. However, the video broadcasting system 100 may include multiple CHEs 116; each CHE 116 may be interconnected to multiple RHEs 130; and each RHE 130 may be interconnected to multiple STB units 148 as may be desired. The network 114 interconnecting the wireless carrier system 102 and the CHE 116 may be any conventional transfer control protocol/internet protocol (TCP/IP) network. The network 126 interconnecting the CHE 116 and the RHE 130 may be a long haul transport network (e.g., gigabit Ethernet network, Asynchronous Transfer Mode (ATM) network, frame relay network) and the like. The network 146 interconnecting the RHE 130 and the STB 148 may be a network such as fiber to the home (FTTH), fiber to the node (FTTN), public switched telephone network (PSTN) (including digital subscriber line (DSL)), coaxial cable, hybrid fiber/coaxial, and combinations thereof. Alternate networks and combinations thereof may also be employed to interconnect the wireless carrier system 102 to the CHE 116, CHE 116 to the RHE 130 and the RHE 130 to the STB 148.

Further with reference to the wireless carrier system 102 of FIG. 1, the wireless carrier system 102 includes a mobile device messaging center module (center module) 104, a mobile device locator module (locator module) 106, a mobile device message delivery module (delivery module) 108, a redirect database 110 and a messaging gateway module (gateway module) 112. Generally, the wireless carrier system 102 provides the ability to send and receive messages (e.g., mobile messaging), including short message service (SMS) messages, concatenated SMS (SMS) messages, enhanced messaging service (EMS) messages, email messages, and the like, to and from one or more devices 128. For clarity and brevity only one device 128 is illustrated. The device 128 may transmit a message destined for a destination mobile device (e.g., illustrated as mobile device 210 in FIG. 2) to the central module 104 of wireless carrier system 102, and may likewise receive a response message from the destination mobile device via the wireless carrier system 102. The device 128 may be any device that can generate a message, such as a messaging-enabled mobile device, and the message may be routed to the central module 104 by plural system components (not shown). Upon receiving the message from device 128 destined for a destination mobile device (e.g., mobile device 210 in FIG. 2), the central module 104 may query a redirect database 110 to determine whether there is a redirection entry for the destination mobile device, as to whether or not any messages destined for the mobile device are to be redirected to another device, such as the STB 148 in vicinity of which the destination mobile device may be located, as will be described hereinafter in reference to FIGS. 2-4 below.

Still further with reference to the wireless carrier system 102 of FIG. 1, if the center module 104 determines that there is no redirection entry for the destination mobile device, the center module 104 requests the locator module 106 to determine a location of the destination mobile device. Upon determining the location of the destination mobile device via locator module 106, the center module 104 transmits the message from device 128 to the delivery module 108 for delivery of the message to the located destination mobile device. However, if the center module 104 determines that there is a redirection entry in the redirect database 110 for the destination mobile device, the center module 104 retrieves from the redirect entry redirection information (e.g., address of device in messaging system 100) for a destination device to which the message is to be redirected (e.g., STB 148). The redirection information identifies, for example, the STB 148 in the video broadcasting system 100 as a destination for the redirection of messages destined for the destination mobile device. For example, an internet protocol (IP) address, a media access control (MAC) address, or the like, may be provided in the redirection information to identify the STB 148 within the broadcasting system 100 for the redirection of messages. Thus, the center module 104 transmits the received message coupled with redirection information (e.g., address for STB 148 in system 100) to the gateway module 112 for ultimate delivery of the received message to the STB 148, as will be described hereinbelow in reference to FIG. 1. It is noted that the messaging gateway module 112 may translate the messages to and from a protocol used by the center module 104.

Further with reference to mobile messaging of video broadcasting system 100 of FIG. 1, the messaging gateway module 112 of wireless carrier system 102 communicatively interconnects the wireless carrier system 102 to the central video head (CHE) 116 via a network 114. More specifically, the messaging getaway module 112 routes the received message from device 128 (and any other messages from device 128 destined for STB 148) from the center module 104 to messaging gateway module 124 of the CHE 116. In turn, the messaging gateway module 124 of the CHE 116 routes the received message (and any other messages from device 128 destined for STB 148) to a messaging gateway 144 of regional video head end (RHE) 130. Thereafter, in turn, the messaging gateway module 144 of the RHE 130 routes the received message (and any other messages from device 128 destined for STB 148) to the network communication module 154 of the STB 148.

Now with particular reference to the video distribution of central video head end (CHE) 116 of FIG. 1, the CHE 116 includes a central video reception module 120 that receives video programming of video broadcasts from multiple video sources, including off-air antenna 117, satellite receiver 118, as well as any other video sources 119, which may include fiber feed sources, video servers and tape machines, which serve video programming. The video programming received by the video reception module 120 may be in a variety of formats, including NTSC, ATSC, MPEG-2, MPEG-4, DVB, Windows Media, baseband digital, and other available formats. The CHE 116 further includes a video distribution module 122 that cooperates with the video reception module 120 to distribute the video programming received by the video reception module 120 to a video broadcast/switch module 138 of a regional video head end (RHE) 130 (described in further detail herein below). More specifically, the video reception module 120 may decode (via one or more video decoders) the video programming received in the aforementioned different formats into a standardized format. In turn, the video distribution module 122 may further encode (via one or more video encoders) the video programming provided in the standardized format by the video reception module 120 into a digital format for ultimate distribution to the STB 148 (e.g., MPEG-2, MPEG-4 and the like). The video distribution module 122 may further multiplex (e.g., via statistical multiplexing) video broadcasts of multiple digital video broadcast channels over one carrier frequency allocation (e.g., 6 MHz or 8 MHz), which is a typical carrier frequency allocation that may be used for one analog channel.

Now with particular reference to the mobile messaging of the regional video head end (RHE) 130, the messaging gateway module 144 of RHE 130 may receive a message (or messages) from the messaging gateway 124 of CHE 116 and may route the message to the appropriate destination STB (e.g., STB 148). More specifically, the RHE 130 may be communicatively interconnected to (e.g., may serve) plural STBs. The messaging gateway module 144 is further communicatively connected to a device driver server 142 that is coupled to a driver database 140 that stores a plurality of synchronization drivers (synch drivers) for different mobile devices. More specifically, upon request of the destination STB (e.g., STB 148), the device driver server 142 may query the driver database 140 to retrieve a synch driver for a particular mobile device (e.g., particular device type and manufacturer) and may further transmit the retrieved synch driver to the destination STB (e.g., STB 148) for installation in the mobile device to facilitate synchronization of messages between the STB 148 and the mobile device, as will be described hereinafter with reference to FIGS. 2, 3 and 5.

Now with particular reference to video distribution of the regional video head end (RHE) 130, the RHE 130 includes a regional video reception module 134 that receives local video programming or broadcasts from multiple video sources, including off-air antenna 131, satellite receiver 132 and other video sources 133. The local video programming received by the regional video reception module 134 may be in a variety of formats, including NTSC, ATSC, MPEG-2, MPEG-4, DVB, Windows Media, baseband digital, and other available formats. The other video sources 133 may include fiber feed sources, video servers and tape machines, which serve video programming. In addition, the other video sources 133 may also include video programming received via telecom transport networks directly from a broadcaster in any of the foregoing formats. The RHE 130 further includes a video distribution module 136 that cooperates with the regional video reception module 134 to distribute the local video programming received by the video reception module 134 to an end-user's STB 148. Similarly to the central video reception module 120 of the CHE 116, the regional video reception module 134 of the RHE 130 may decode (via video decoders) the local video programming received in the aforementioned different formats into a standardized format. In turn, the video distribution module 136 may further encode (via video encoders) the video programming provided in the standardized format by the regional video reception module 134 into a digital format for ultimate distribution to the STB 148 (e.g., MPEG-2, MPEG-4 and the like). The video distribution module 136 may further multiplex (e.g., via statistical multiplexing) video broadcasts of multiple digital video broadcast channels over one carrier frequency allocation (e.g., 6 MHz or 8 MHz). Still further, the video programming from the video distribution module 122 of the CHE 116 and the video programming from the video distribution module 136 of the RHE 128 are distributed to the video broadcast/switch module 138, which broadcasts or switches channels of the video programming from the CHE 116 and the RHE 130 to a video receiver module 188 of the end-user's STB 148 (described hereinafter in greater detail).

Now with particular reference video distribution of STB 148, the STB 148 includes a video receiver module 188, a tuning module 190 and a display module 192. The video receiver module 188 receives video programming from the video broadcast/switch module 138 of the RHE 130. Upon channel selection by a user via a remote control 194, the tuning module 190 may select a particular channel from the video programming received by the video receiver module 188 (if multiple channels including the channel selected are being received) for display by the display module 192 on the display device 196. Alternatively, upon channel selection by the user via the remote control 194, the tuning module 190 may request the video receiver 188 to request the video broadcast/switch module 138 to switch the video programming to the requested channel (if a non-requested channel is being received) for display by the display module 192 on the display device 196.

Further with particular reference to a mobile messaging of the STB 148, the STB 148 includes an STB messaging system 150 that facilitates a redirection of mobile messages to or a synchronization of mobile messages with the STB 148. More specifically, in one aspect, the STB messaging system 150 facilitates mobile messages destined for a mobile device to be redirected from the wireless carrier system 102 and to be received at the STB 148 for display to a user. In another aspect, the STB messaging system 150 facilitates mobile messages received by a mobile device from the wireless carrier system 102 to synchronized with the STB 148 for display to a user. The STB messaging system 150 include a communication subsystem 152, a mobile device connection system 158, a message transmission subsystem 166, and a message transmit/receive subsystem 178, as will described in greater detail below.

Now with reference to the communication subsystem 152 of STB messaging system 150 of FIG. 1, the communication subsystem 152 includes a network communication module 154 that is enabled to communicate with the messaging gateway module 144 of the RHE 130 via network 146, as well as a device communication module 156 that is enabled to wirelessly communicate with a mobile device that is within the vicinity (e.g., operational range) of the STB 148 via one or more protocols, such as Bluetooth, 802.11 (Wi-Fi), infrared, and the like.

Further with reference to the mobile device connection subsystem 158, the mobile device connection subsystem 158 includes a detection module 160 that detects whether a mobile device is within an operational range (FIG. 2) of the STB 148 to facilitate message redirection or synchronization as will be described herein. The operational range may be determined based on signal-to-noise (SNE) ratio or any other conventional mechanism. If detection module determines that the mobile device is within range of the STB 148, the identification module 162 identifies the mobile device, such as by querying the mobile device's electronic serial no. (ESN), telephone number, device type and/or manufacturer, wireless carrier system to which the device is registered, as well as any other identifying information to connect the STB 148 to the mobile device (e.g., mobile device 210 of FIG. 2). After identification, the connection module 164 connects the STB 148 to the mobile device via device communication module 156. A session between the STB 148 and the mobile device (e.g., mobile device 210 of FIG. 2) may be maintained by the connection module 164 for the duration of the connection. The alert module 165 generates an audiovisual alerts to alert a user that connection has been established and message handling will be required, as will be described hereinbelow.

Now with reference to the message transmission subsystem 166, the message transmission subsystem 166 includes a message handler module 169 that queries a user relating to message handling, such as whether to redirect or synchronize mobile messages. Upon selection of a message handling option, the message handler module 169 invokes a message redirect module 168 that facilitates redirection of messages to the STB 148, or a message synchronization module 170 that facilitates message synchronization between a mobile device and STB 148. The message transmission subsystem 166 further includes a device driver determination module 172 that determines whether a mobile device includes a message synch driver (e.g., firmware, software) that enables message synchronization between a mobile device and STB 148. If device driver determination module 172 determines that a mobile device does not include a message synch driver, the device driver retrieval module 174 requests the driver for the particular mobile device (based on the identification of the mobile device) from the device driver server 142, which queries synch driver database 140 as described herein. It is noted that the device driver server 142 and/or synch driver database 140 may be disposed anywhere in video broadcasting system 100 (e.g., at the CHE 116, the wireless carrier system 102, or any other node not enumerated in video broadcasting system 100). Upon retrieval of the synch driver, the device diver transmission module 176 transmits the synch driver to the mobile device via device communication module 156. The mobile device may thereafter automatically install the synch driver, or the mobile device may query a user thereof as to whether or not to install the synch driver.

With reference to the message transmit/receive subsystem 178, the message transmit/receive subsystem 178 includes a message receipt module 186 that facilitates receipt of messages from the wireless carrier system 102 (redirection) and/or the mobile device (synchronization) for display on the display device 196 via display module 192. The message transmit/receive subsystem 178 also includes a message transmission module 180 that facilitates the transmission of messages from the STB 148 to the center module 104 of the wireless carrier system 102, in redirect and/or synchronize modes as described hereinbelow. The message transmission module 180 may receive messages to be transmitted from the STB 148 to the wireless carrier system 102 via network communication module 154 from the mobile device message module 182 or the STB message module 184. More specifically, the mobile device messaging module 182 may receive messages for transmission from the mobile device, while the STB message module 184 may received the message for transmission via the STB 148, such as for example via an attached keyboard, via an STB virtual keyboard or remote control 194.

Figure 2:
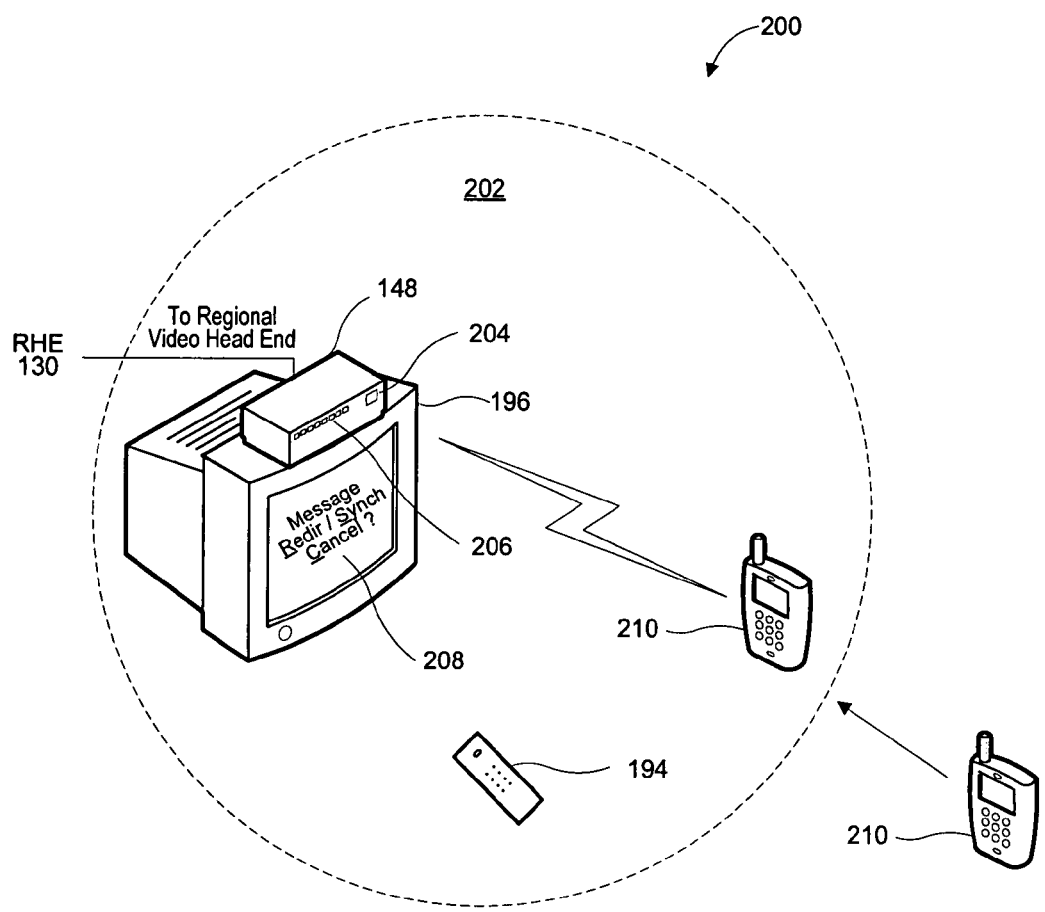
FIG. 2 is a high-level diagram depicting an example network formed between a mobile device and a set top box (STB)

FIG. 2 is a high-level diagram depicting an example network 200 formed between a mobile device 210 and a set top box (STB) 148. The mobile device 210 may connect to the STB 148 (e.g., video terminal device) via any know protocol, such as 802.11 (Wi-Fi), Bluetooth, infrared and the like, to form a wireless network connection. It is noted that the mobile device 210 is enabled for mobile messaging, e.g., sending and receiving mobile messages as described hereinabove. Upon, the mobile device 210 coming into operational range 202 of the STB 148, the STB 148 may detect, identify and connect to the mobile device 210 via the device communication module 156 and mobile device connection subsystem 158 (FIG. 1) to form a network connection. Upon a successfully establishing the network connection, the STB 148 may inform the user via alert module 165 and audiovisual alert display 204 that a connection has been established and input is required from the user (e.g., via display device 196) and may further query the user via message handler module 169 presenting user interface (UI) 208 on display device 196 whether to messages destined for the mobile device 210 are to be redirected to the STB 148 or synchronized with the STB 148. It is noted, that in a certain embodiment, the redirection or synchronization may be preset in the STB 148 (not shown) and automatically determined at the time the network connection between the STB 148 and the mobile device 210 is established. The user may use a console 206 on the STB 148 or remote control 194 to select an appropriate message handling option (e.g., redirect or synchronize) or to cancel in response to the query presented via the UI 208. Once the user selects the message handling option, the STB 128 either redirects or synchronizes messages via the message transmission module 166 (FIG. 1).

Figure 3:
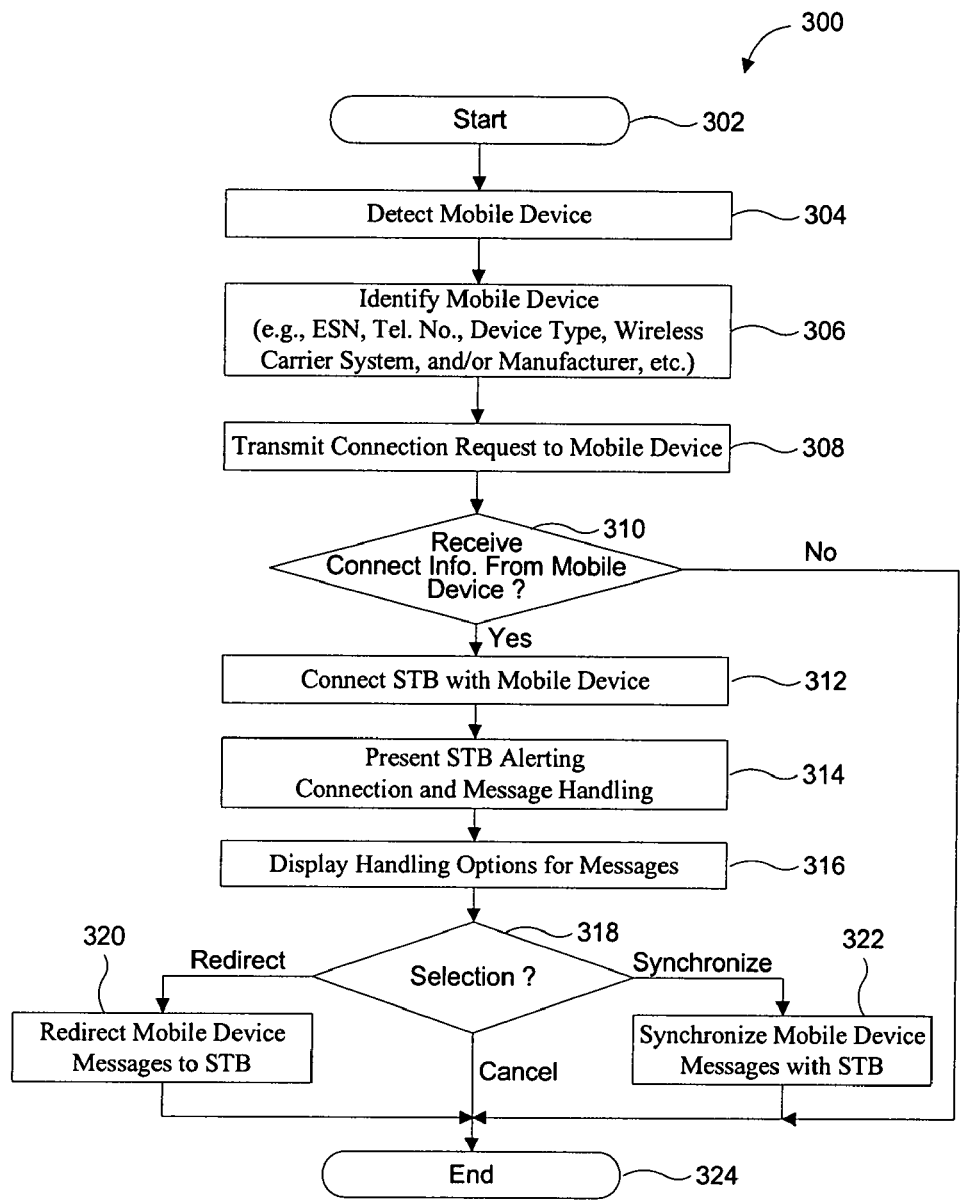
FIG. 3 is flowchart that illustrates an example method performed by STB to set up a connection between the STB and mobile device and to determine a message handling option in accordance with FIGS. 1-2.

FIG. 3 is flowchart that illustrates an example method 300 performed by STB 148 to set up a connection between the STB 148 and mobile device 210 and to determine a message handling option in accordance with FIGS. 1-2. More specifically, the method begins at operation 302 in which a messaging-enabled mobile device 210 comes into an operational range 202 of the STB 148 (FIG. 2). At operation 304, the detection module 160 of the mobile device subsystem 158 of the STB 148 (FIG. 1) detects the mobile device 210 as being in the operation range 202. At operation 306, the identification module 162 of the of the mobile device subsystem 158 of the STB 148 (FIG. 1) identifies the mobile device. Identification of the mobile device may include identifying the mobile device 210 ESN, telephone number, device type and/or manufacturer, wireless carrier system to which the device is registered, as well as any other identifying information necessary for STB 148 to connect to the mobile device 210 as well as to redirect/synchronize messages as described herein. At operation 308, the connection module 164 of the of the mobile device subsystem 158 of the STB 148 (FIG. 1) transmits a connection request to the mobile device requesting to form a wireless network connection in accordance with one of the foregoing protocols (e.g., Wi-Fi, Bluetooth, infrared, and the like). Thereafter, at operation 310 the connection module 164 determines whether connection information for a connection is received from the mobile device 210, and if so, at operation 312 the connection module 164 uses the received connection information to connect the STB 148 via device communication module 156 with the mobile device 210, forming a wireless connection network. If no connection information is received at operation 310, the method 300 terminates at operation 324.

Further with reference to FIG. 3, at operation 314 the STB 148 via alert module 165 and audiovisual display 204 may present the user with an audiovisual alert that a connection has been established and input is required from the user for message handling options. At operation 316, message transmission subsystem 166 via message handler module 169 may further display user interface (UI) 208 on display device 196, querying the user as to message handling options, e.g., whether messages destined for the mobile device 210 are to be redirected to the STB 148 or synchronized with the STB 148. At operation 318, the message handler module 169 determines the user's message handling selection (e.g., redirect, synchronize or cancel). As noted above with reference to FIG. 2, the selection may be preset via message handler module 169 and automatically selected. If it is determined that redirection is selected, the method 300 continues at operation 320 to redirect messages destined for the mobile device 210 to the STB 148. If, however, it is determined that synchronization is selected at operation 318, the method 300 continues at operation 322 to synchronize messages received at the mobile device 210 with the STB 148. Redirection of operation 320 is illustrated in greater detail in flowchart of FIG. 4 and synchronization of operation 322 is illustrated in greater detail in flowchart of FIG. 5. The example method 300 ends at operation 324.

Figure 4:
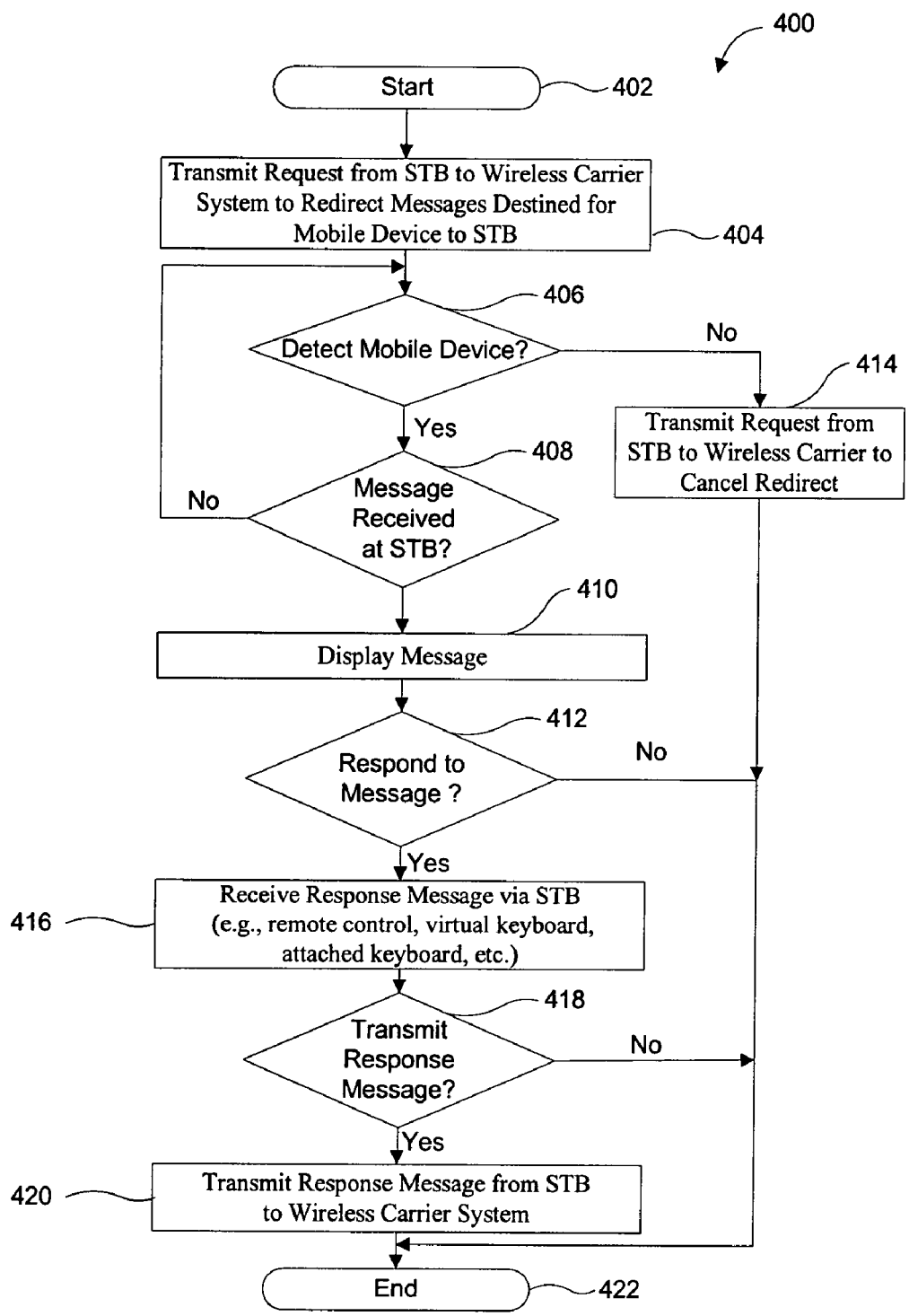
FIG. 4 is flowchart that illustrates an example method for the redirection of messages destined for the mobile device to the STB, in accordance with FIGS. 1-3.

FIG. 4 is flowchart that illustrates an example method 400 for the redirection of messages destined for mobile device 210 to the STB 148, in accordance with FIGS. 1-3. The example method 400 starts at operation 402 and describes in greater detail operation 320 of FIG. 3. It is noted that at this point the STB 148 has detected and identified mobile device 210, a network connection has been formed between the STB 148 and the mobile device 210. At operation 404, the STB 148 transmits a request to wireless carrier system 102 (identified during mobile device 210 identification) to redirect messages destined for the mobile device 210 to the STB 148. The redirect request may include specific information identifying the mobile device within the wireless carrier system 102 (e.g., electronic serial no. (ESN), telephone no., wireless carrier system (e.g., identifier) to which the device is registered and the like) and specific address information identifying the STB 148 to which the messages destined for the mobile device 210 should be redirected. More specifically, the message redirect module 168 of the STB 148 transmits the described redirect request to the center module 104 of the wireless carrier system 102. In response to the redirect request, the center module 104 may generate a redirect record (not shown) in the redirect database 110 for the mobile device 210, including information identifying the mobile device 210 and information identifying the STB 148. Upon receiving any messages for the mobile device 210, the center module 104 may query the redirect database 110, and if a redirect entry exists for the mobile device, the center module 104 may redirect the messages to the STB 148 via the specific address information in the redirect entry identifying the STB 148.

Now with reference to operation 406 of FIG. 4, the detection module 160 of the STB 148 determines whether the mobile device 210 is detected within the operational range 202 of the STB 148. As described hereinabove, the operational range may be determined based on signal to noise ratio (SNR) or any other conventional mechanism. If the mobile device 210 is detected within operational range 202 at operation 406, the method 400 continues at operation 408 where the message receipt module 186 of the STB 148 determines whether a message is received from the wireless carrier system 102 (e.g., from device 128) for the mobile device 210 and if no message is received the method continues detection at operation 406. If however, the mobile device 210 is not detected within operational range 202 at operation 406, the method continues at operation 414 where the message redirect module 168 transmits a request to the wireless carrier system 102 to cancel redirection of messages destined for the mobile device 210 to the STB 148. It is however noted that the detection of the mobile device 210 may occur for a predetermined amount of time of may be retried multiple times before the method continues at operation 414, so as to avoid temporary interruption of communication between STB 148 and mobile device 210. After cancellation of redirection, the method 400 ends at operation 422.

Further with reference to FIG. 4, if at operation 408 it is determined that a redirected message is received at the STB 148 from center module 104 of wireless carrier system 102 (e.g., from device 128 of FIG. 1), the message is displayed at operation 410. At operation 412, it is determined (via STB message module 182) whether a response to the received and displayed message is being generated. If no response is generated, the method 400 ends at operation 422. Alternatively, if a response message is being generated, the response message is received by the STB message module 184 at operation 416. The response message may be received by the STB message module 184 via the remote control 194, a virtual keyboard displayed on the display device 196 and operated by remote control 194, or a keyboard (not shown) attached to the STB 148. At operation 418, the message transmission module 180 of the STB 148 determines whether the response message should be transmitted to device 128. This determination may be accomplished by determining whether a user depresses a "transmit" button (not shown) on the remote control 194, virtual keyboard (not shown) or attached keyboard (not shown) designated to transmit the response message to the device 128. Upon message transmission module 180 determining that the response message should be transmitted to device 128, the message transmission module 160 transmits the response message via network communication module 154 to the center module 104 of wireless carrier system 102. It is noted that the center module 104 may determine whether the response message to device 128 should also be redirected by querying redirect database 110, in a situation in which the device 128 has instructed a STB to redirect messages destined for the device 128 to the STB. Alternatively, the center module 104 may locate device 128 via locator module 106 and deliver the response message via delivery module 108 to device 128.

Figure 5:
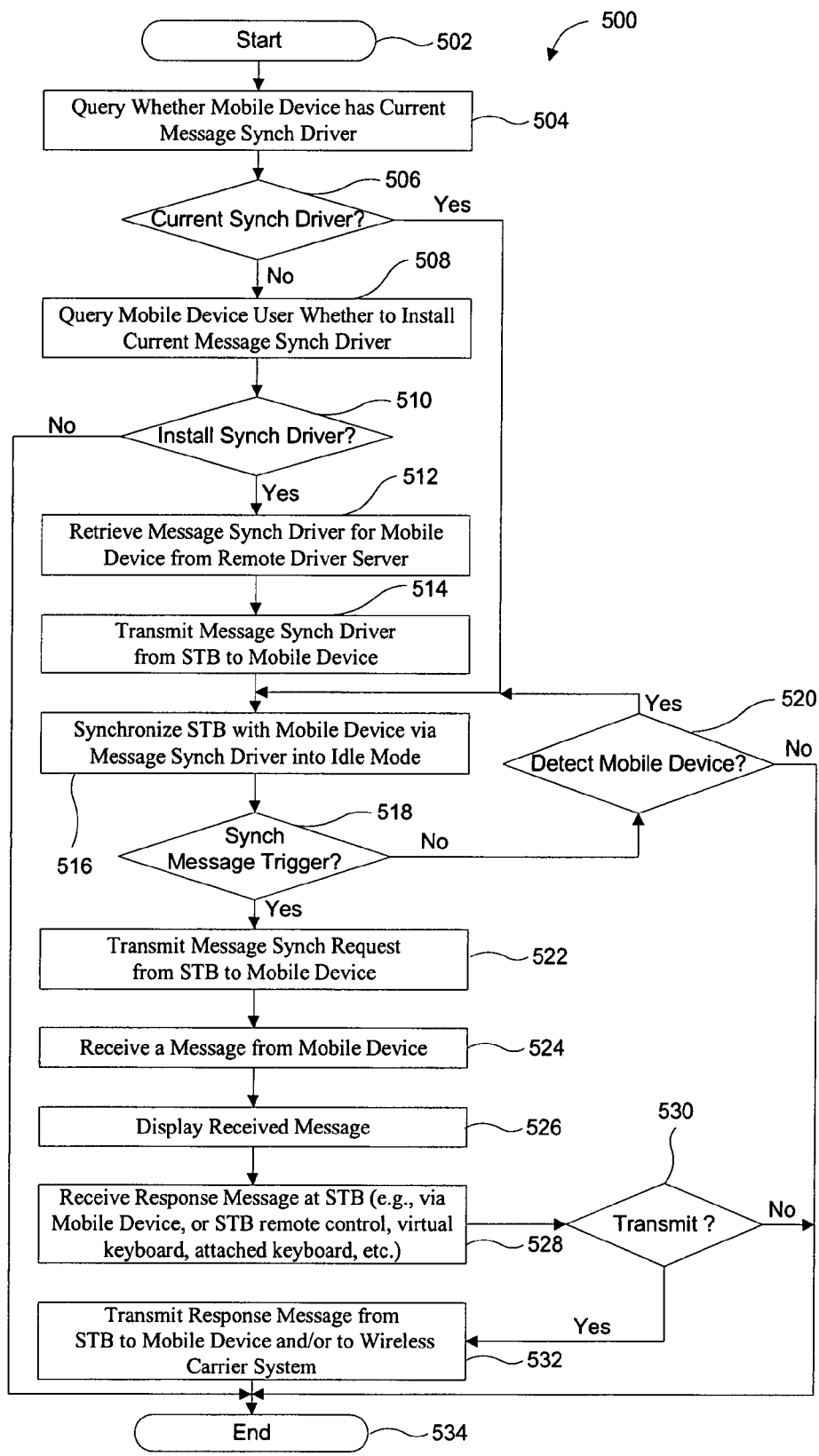
FIG. 5 is flowchart that illustrates an example method for the synchronization of messages between the mobile device and the STB, in accordance with FIGS. 1-3.

FIG. 5 is flowchart that illustrates an example method 500 for the synchronization of messages between mobile device 210 to the STB 148, in accordance with FIGS. 1-3. The example method 400 starts at operation 502 and describes in greater detail operation 322 of FIG. 3. It is noted that at this point the STB 148 has detected and identified mobile device 210, and a network connection has been formed between the STB 148 and the network device 210. At operation 504, the device driver determination module 172 queries the mobile device 210 as to whether the mobile device 210 includes a current message synch driver for synchronizing messages between the mobile device 210 and the STB 148. The device driver determination module 172 receives a response to the query from mobile device 210 and at operation 506 determines whether the response indicates that the mobile device includes a current synch driver. If mobile device 210 includes the current synch driver, method 500 continues at operation 516 as described below. If mobile device 210 does not include the current synch driver, the method 500 continues at operation 508 where the device driver determination module 172 queries the mobile device whether to install the current synch driver. If the response received from the mobile device 210 indicates that current synch driver is not to be installed, the method 500 ends at operation 532.

Alternatively with reference to operation 510 of FIG. 5, if it is determined that current synch driver is to be installed, the method 500 continues at operation 512, where the device driver retrieval module 174 retrieves the message synch driver for mobile device 210 from remote device driver server 142 of RHE 130. Device driver server 142 may query driver database 140 to retrieve the synch driver for the particular mobile device 210. At operation 514, the device driver transmission module 176 transmits the synch driver from STB 148 mobile device 210. The synch driver may be installed automatically or by the user of mobile device 210. At operation 516, message synchronization module 170 synchronizes the STB with the mobile device 210 via synch driver installed in the mobile device 210 into an idle mode, waiting for a synch message trigger. The synch message trigger may be the user selecting to synchronize the STB 148 with mobile device 210 via UI 208, or automatic synchronization such as the message synchronization module 170 determining that the user has changed channels via tuning module 190, for example. At operation 518, a message synchronization module 170 determines whether a synch message trigger has occurred. If no synch message trigger is determined to have occurred, then the method continues at operation 520 in which the detection module 160 determines whether the mobile device 210 is within an operational range 202 of the STB 148 to facilitate message synchronization. If mobile device 210 is detected within operational range 202, the method 500 continued in idle mode at operation 516. Alternatively, if mobile device is not detected within operational range 202, the method ends at operation 534. It is however noted that the detection of the mobile device 210 may occur for a predetermined amount of time or may be retried multiple times before the method continues at operation 534, so as to avoid temporary interruption of synchronization between STB 148 and mobile device 210.

Further with reference to operation 518 of FIG. 5, if synch message trigger is determined to have occurred, the method 500 continues at operation 522 where the message synchronize module 170 transmits to mobile device 210 a message synchronization request. At operation 524, the message receipt module 186 of the STB 148 receives from the mobile device 210 a message received by the mobile device via wireless carrier system 102 from device 128. The message receipt module 186 displays the received message via display module 192 on the display device 196 to the user. At operation 528, a response message is received by the mobile device message module 182 via mobile device 210, or the STB message module 184 via the remote control 194, a virtual keyboard displayed on the display device 196 and operated by remote control 194, or a keyboard (not shown) attached to the STB 148. At operation 530, the message transmission module 180 of the STB 148 determines whether the response message should be transmitted to device 128. This determination may be accomplished by determining whether a user depresses a "transmit" button on the mobile device 210, the remote control 194, virtual keyboard (not shown) or attached keyboard (not shown) designated to transmit the response message to the device 128. Upon message transmission module 180 determining that the response message should be transmitted to device 128 at operation 530, the method continues at operation 532 where the message transmission module 180 transmits the response message to the mobile device 210 via message synchronization module 170 and/or to the center module 104 of wireless carrier system 102 for delivery to the device 128. In an embodiment, the response message may be delivered by the STB 148 to the wireless carrier system 102, and synchronized to the mobile device 210. In an alternate embodiment, the STB 148 may synchronize the response message to the mobile device 210, which then delivers the response message to the wireless carrier system 102 via it own wireless connection thereto. The method thereafter ends at operation 534.

Figure 6:
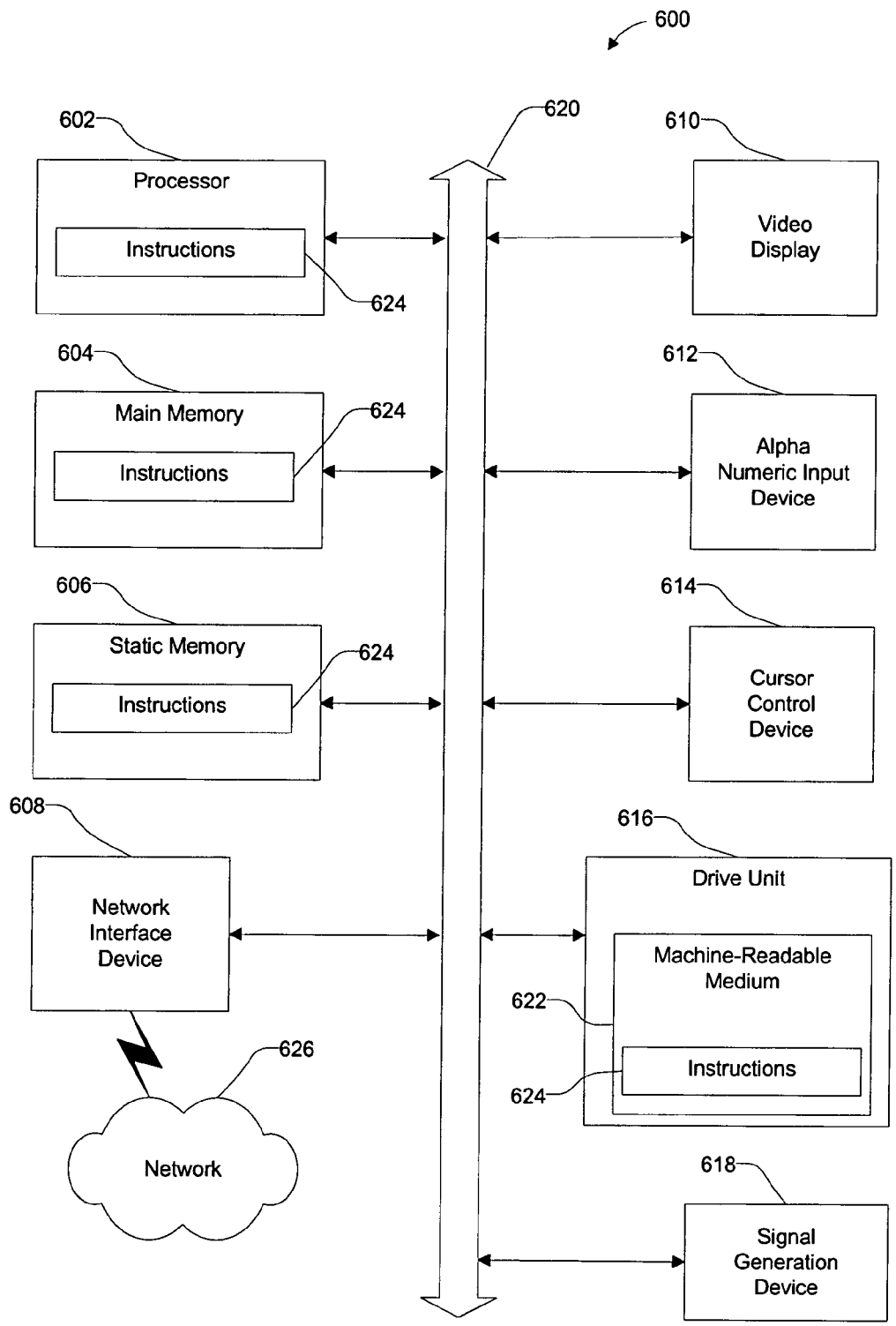
FIG. 6 is a diagrammatic representation of machine in an example form of a computer system within which a set of instructions, for causing the machine to perform any one or more of the methodologies described herein in FIGS. 1-5, may be executed.

FIG. 6 is a diagrammatic representation of machine in an example form of a computer system within which a set of instructions, for causing the machine to perform any one or more of the methodologies discussed herein in FIGS. 1-5, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 6, the example computer system 600 includes a processor 602 (e.g., a central processing unit (CPU), a graphics processing unit (GPU) or both), a main memory 604 and a static memory 606, which communicate with each other via a bus 620. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 508.

Still further with reference to FIG. 6, the disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 608 utilizing any one of a number of well-known transfer protocols (e.g., HTTP).

Lastly with reference to FIG. 6, while the machine-readable medium 622 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for set top box (STB) messaging have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method for video terminal device messaging, the method comprising:
    querying a user associate with a mobile device to enable a user to determine whether to receive one or more mobile messages destined for the mobile device at a video terminal device;
    receiving a user selection to redirect the one or more mobile messages;
    transmitting a redirect request from the video terminal device to the wireless carrier system for the wireless carrier system to redirect the one or more mobile messages destined for the mobile device from the wireless carrier system to the video terminal device;
    detecting whether the mobile device is connected to the network connection between the video terminal device and the mobile device;
    selectively receiving the one or more mobile messages at the video terminal device based on a response to the query if the mobile device is detected; and
selectively transmitting a cancel request from the video terminal device to the wireless carrier system to cancel redirection of the one or more mobile messages destined for the mobile device from the wireless carrier system to the video terminal device if mobile device is detected not to be connected.

2. The method for video terminal device messaging of claim 1, wherein the video terminal device is a set top box.

3. The method for video terminal device messaging of claim 1, further comprising displaying the received one or more mobile messages on a display device associated with the video terminal device.

4. The method for video terminal device messaging of claim 1, further comprising:
    generating a response message to at least one received mobile message; and
    transmitting the response message from the video terminal device destined to at least one sending device associated with the at least one received mobile message.

5. The method for video terminal device messaging of claim 1, further comprising forming a wireless network connection between the video terminal device and the mobile device.

6. The method for video terminal device messaging of claim 5, wherein forming the wireless network connection includes:
    detecting the mobile device within an operational range of the video terminal device;
    identifying the mobile device, including the mobile device's electronic serial number (ESN) and wireless carrier system to which the mobile device is registered;
    transmitting a connection request from the video terminal device to the mobile device;
    receiving a connection response including connection information from the mobile device in response to the connection request; and
    connecting the video terminal device to the mobile device using the connection information.

7. The method for video terminal device messaging of claim 5, wherein querying further includes querying whether to redirect the one or more mobile messages destined for the mobile device from a wireless carrier system serving the mobile device to the video terminal device, or whether to synchronize the one or more mobile messages destined for the mobile device with the video terminal device.

8. The method for video terminal device messaging of claim 7, further comprising:
    receiving a user selection to synchronize the one or more mobile messages destined for the mobile device with the video terminal device; and
    transmitting a synch request from the video terminal device to the mobile device; and
    receiving the one or more mobile messages from the mobile device at the video terminal device in response to the synch request.

9. A system for video terminal device messaging, the system comprising:
    a message handler module to, query a user associated with a mobile device to enable a user to determine whether to receive one or more mobile messages destined for the mobile device at a video terminal device;
    a message redirect module to receive a user selection to redirect the one or more mobile messages, and transmit a redirect request from the video terminal device to the wireless carrier system to redirect the one or more mobile messages destined for the mobile device from the wireless carrier system to the video terminal device;
    a detection module to detect whether the mobile device is connected to the network connection between the video terminal device and the mobile device, wherein the message redirect module selectively transmits a cancel request from the video terminal device to the wireless carrier system to cancel redirection of the one or more mobile messages destined for the mobile device from the wireless carrier system to the video terminal device if mobile device is not connected; and
    a message receipt module to selectively receive the one or more mobile messages at the video terminal device based on a response to the query.

10. The system of claim 9, wherein the video terminal device is a set top box.

11. The system of claim 9, further comprising a display module to display the one or more mobile messages on a display device associated with the video terminal device.

12. The system of claim 9, further comprising:
    a message generation module to generate a response message to at least one received mobile message; and
    a message transmission module to transmit the response message from the video terminal device destined to at least one sending device associated with the at least one received mobile message.

13. The system of claim 9, further comprising a connection module to form a wireless network connection between the video terminal device and the mobile device.

14. The system of claim 9, further comprising:
a detection module to detect the mobile device within an operational range of the video terminal device;
an identification module to identify the mobile device, including the mobile device's electronic serial number (ESN) and wireless carrier system to which the mobile device is registered;
a connection module to transmit a connection request from the video terminal device to the mobile device, receive a connection response including connection information from the mobile device in response to the connection request, and connect the video terminal device to the mobile device using the connection information.

15. The system of claim 13, wherein the message handler module queries whether to redirect the one or more mobile messages destined for the mobile device from a wireless carrier system serving the mobile device to the video terminal device, or whether to synchronize the one or more mobile messages destined for the mobile device with the mobile device.

16. The system of claim 15, further comprising a message synch module to receive a user selection to synchronize the one or more mobile messages destined for the mobile device with the video terminal device, and transmit a synch request from the video terminal device to the mobile device, wherein the message receipt module receives the one or more mobile messages from the mobile device at the video terminal device in response to the synch request.

17. A non-transitory machine-readable medium including instructions executable by the machine for video terminal device messaging, the instructions causing the machine to:
query a user associated with a mobile device to enable a user to determine whether to receive one or more mobile messages destined for the mobile device at a video terminal device; and
receive a user selection to redirect the one or more mobile messages;
transmit a redirect request from the video terminal device to the wireless carrier system for the wireless carrier system to redirect the one or more mobile messages destined for the mobile device from the wireless carrier system to the video terminal device;
detect whether the mobile device is connected to the network connection between the video terminal device and the mobile device;
selectively receive the one or more mobile messages at the video terminal device based on a response to the query if the mobile device is detected; and
selectively transmit a cancel request from the video terminal device to the wireless carrier system to cancel redirection of the one or more mobile messages destined for the mobile device from the wireless carrier system to the video terminal device if mobile device is not connected.

18. The machine-readable medium of claim 17, wherein the video terminal device is a set top box.

19. The machine-readable medium of claim 17, further comprising instructions causing the machine to display the one or more mobile messages on a display device associated with the video terminal device.

20. The machine-readable medium of claim 17, further comprising instructions causing the machine to:
generate a response message to at least one received mobile message; and
transmit the response message from the video terminal device destined to at least one sending device associated with the at least one received mobile message.

21. The machine-readable medium of claim 17, further comprising instructions causing the machine to form a wireless network connection between the video terminal device and the mobile device.

22. The machine-readable medium of claim 21, wherein instructions to form the network connection further include instructions causing the machine to:
detect the mobile device within an operational range of the video terminal device;
identify the mobile device, including the mobile device's electronic serial number (ESN) and wireless carrier system to which the mobile device is registered;
transmit a connection request from the video terminal device to the mobile device;
receive a connection response including connection information from the mobile device in response to the connection request; and
connect the video terminal device to the mobile device using the connection information.

23. The machine-readable medium of claim 21, wherein instruction to query further include instructions causing the machine to query as to whether to redirect the one or more mobile messages destined for the mobile device from a wireless carrier system serving the mobile device to the video terminal device, or whether to synchronize the one or more mobile messages destined for the mobile device with the mobile device.

24. The machine-readable medium of claim 23, further comprising instructions causing the machine to:
receive a user selection to synchronize the one or more mobile messages destined for the mobile device with the video terminal device; and
transmit a synch request from the video terminal device to the mobile device; and
receive the one or more mobile messages from the mobile device at the video terminal device in response to the synch request.

25. A method for redirecting a mobile message, the method comprising:
receiving a mobile message from at least one sending device destined for a recipient's mobile device;
selectively transmitting the received mobile message to a video terminal device based on a redirect request from the video terminal device,
wherein the redirect request is established based on a response from the recipient's mobile device;
detecting whether the recipient's mobile device is connected to the network connection between the video terminal device and the recipient's mobile device;
selectively receiving the one or more mobile messages at the video terminal device if the recipient's mobile device is detected; and
selectively transmitting a cancel request from the video terminal device to the wireless carrier system to cancel redirection of the one or more mobile messages destined for the mobile device from the wireless carrier system to the video terminal device if mobile device is detected not to be connected.

26. The method for redirecting a mobile message of claim 25, wherein selectively transmitting includes:
querying a database for a redirect entry relating to redirecting mobile messages destined for the mobile device;
retrieving addressing information associated the video terminal device from the redirect entry if the redirect entry is stored in the database; and transmitting the received mobile message to the video terminal device using the associated addressing information.

27. A wireless carrier system for redirecting a mobile message, the wireless carrier system comprising:
a messaging module to:
receive a mobile message from at least one sending device destined for a recipient's mobile device; and
selectively transmit the received mobile message to a video terminal device based on a redirect request from the video terminal device,
wherein the redirect request is established based on a response from the recipient's mobile device; and
a detection module to:
detect whether the recipient's mobile device is connected to a network connection between the video terminal device and the recipient's mobile device, wherein the messaging module selectively transmits a cancel request from the video terminal device to the wireless carrier system to cancel redirection of the one or more mobile messages destined for the recipient's mobile device from the wireless carrier system to the video terminal device if the recipient's mobile device is not connected.

28. The wireless carrier system for redirecting a mobile message of claim 27, wherein the messaging module is further to:
query a database for a redirect entry relating to redirecting mobile messages destined for the mobile device;
retrieve addressing information associated the video terminal device from the redirect entry if the redirect entry is stored in the database; and
transmit the received mobile message to the video terminal device using the associated addressing information.

29. A machine-readable medium including instructions executable by the machine for redirecting a mobile message, the instructions causing the machine to:
receive a mobile message from at least one sending device destined for a recipient's mobile device;
selectively transmit the received mobile message to a video terminal device based on a redirect request from the video terminal device,
wherein the redirect request is established based on a response from the recipient's mobile device
detect whether the recipient's mobile device is connected to the network connection between the video terminal device and the recipient's mobile device; and
selectively transmitting a cancel request from the video terminal device to the wireless carrier system to cancel redirection of the one or more mobile messages destined for the recipient's mobile device from the wireless carrier system to the video terminal device if recipient's mobile device is not connected.

30. The machine-readable medium of claim 29, wherein instructions causing the machine to selectively transmit include instructions to:
query a database for a redirect entry relating to redirecting mobile messages destined for the mobile device;
retrieve addressing information associated the video terminal device from the redirect entry if the redirect entry is stored in the database; and
transmit the received mobile message to the video terminal device using the associated addressing information.

31. A method for video terminal device messaging, the method comprising:
transmitting a request from a video terminal device to a mobile device to synchronize one or more mobile messages destined for the mobile device with the video terminal device;
selectively receiving the one or more mobile messages at the video terminal device from the mobile device in response to the request;
receiving a user selection to redirect the one or more mobile messages;
transmitting a redirect request from the video terminal device to the wireless carrier system for the wireless system to redirect the one or more mobile messages destined for the mobile device from the wireless carrier system to the video terminal device;
detecting whether the mobile device is connected to the network connection between the video terminal and the mobile device; and
selectively transmitting a cancel request from the video terminal device to the wireless carrier system to cancel redirection of the one or more mobile messages destined for the mobile device from the wireless carrier system to the video terminal device if mobile device is not connected.

32. The method for video terminal device messaging of claim 31, further comprising displaying the received one or more mobile messages on a display device associated with the video terminal device.

33. A system for video terminal device messaging, the system comprising:
a message redirect module to receive a user selection to redirect one or more mobile messages and to transmit a redirect request received in response to a query querying a user associated with a mobile device to enable a user to determine whether to receive one or more mobile messages destined for the mobile device at a video terminal device;
a synchronization module to transmit a request from a video terminal device to a mobile device to synchronize one or more mobile messages destined for the mobile device with the video terminal device;
a detection module to detect whether the mobile device is connected to the network connection between the video terminal device and the mobile device, wherein the messages redirect module selectively transmits a cancel request from the video terminal device to the wireless carrier system to cancel redirection of the one or more mobile messages destined fro the mobile device from the wireless carrier system to the video terminal device if mobile device is not connected; and
a receipt module to selectively receive the one or more mobile messages from the mobile device in response to the request if the mobile device is connected.

34. The system for video terminal device messaging of claim 33, further comprising a display module to display the received One or more mobile messages on a display device associated with the video terminal device.

35. A machine-readable medium including instructions executable by the machine for redirecting a mobile message, the instructions causing the machine to:
transmit a request from a video terminal device to a mobile device to synchronize one or more mobile messages destined for the mobile device with the video terminal device;
receiving a user selection to redirect the one or more mobile messages;

transmitting a redirect request from the video terminal device to the wireless carrier system for the wireless carrier system to redirect the one or more mobile messages destined for the mobile device from the wireless carrier system to the video terminal device;

detecting whether the mobile device is connected to the network connection between the video terminal device and the mobile device; and selectively transmitting a cancel request from the video terminal device to the wireless carrier system to cancel redirection to the one or more mobile messages destined for the mobile device from the wireless carrier system to the video terminal device if mobile is not connected; and selectively receive the one or more mobile messages from the mobile device in response to the request.

36. The machine-readable medium of claim 35, further comprising instructions causing the machine to display the received one or more mobile messages on a display device associated with the video terminal device.

* * * * *